US012322779B2

(12) United States Patent
Chen et al.

(10) Patent No.: US 12,322,779 B2
(45) Date of Patent: Jun. 3, 2025

(54) STACKED SEPARATOR PLATES WITH COOLANT FLOW DISTRIBUTION CHANNELS FOR LIQUID IMMERSION COOLING IN BATTERY ASSEMBLIES (71) Applicant: GM GLOBAL TECHNOLOGY OPERATIONS LLC, Detroit, MI (US)

(72) Inventors: William Yu Chen, Troy, MI (US); Chih-hung Yen, Bloomfield Hills, MI (US); Stephane Watts, La Teste de Buch (FR); Frederic Albergucci, Bordeaux (FR)

(73) Assignee: GM Global Technology Operations LLC, Detroit, MI (US)

( * ) Notice: Subject to any disclaimer, the term of this patent is extended or adjusted under 35 U.S.C. 154(b) by 345 days.

(21) Appl. No.: 18/076,553

(22) Filed: Dec. 7, 2022

(65) Prior Publication Data
US 2024/0194973 A1    Jun. 13, 2024

(51) Int. Cl.
*B60K 1/04* (2019.01)
*H01M 10/058* (2010.01)
(Continued)

(52) U.S. Cl.
CPC ........... *H01M 10/6557* (2015.04); *B60K 1/04* (2013.01); *H01M 10/058* (2013.01);
(Continued)

(58) Field of Classification Search
CPC ...... B60L 58/26; B60L 50/64; H01M 10/613; H01M 10/6557; H01M 50/249; B60K 1/04

See application file for complete search history.

(56) References Cited

U.S. PATENT DOCUMENTS 4,350,026 A * 9/1982 Klein ........................ F28B 1/06
257/714
6,889,515 B2 5/2005 Tilton et al.
(Continued)

OTHER PUBLICATIONS

Han et al., Utility U.S. Appl. No. 17/743,605, filed May 13, 2022 (unpublished).
(Continued)

*Primary Examiner* — Jason D Shanske
*Assistant Examiner* — James J Triggs
(74) *Attorney, Agent, or Firm* — Quinn IP Law (57) ABSTRACT Presented are thermal management systems using coolant flow distribution plates for immersion cooling of battery cells, methods for making/using such systems, and vehicles equipped with such systems for cooling the vehicles' battery packs. A battery assembly includes multiple battery cells arranged in adjacent, mutually parallel cell rows. The battery cells are stored inside a protective battery housing that includes inlet and outlet fluid ports for receiving and evacuating therethrough dielectric coolant fluid. A pair of (first and second) separator plates is located between each neighboring pair of cell rows. Each plate includes coolant channels that are arranged in mutually parallel channel bands. The separator plates are in face-to-face contact with each other such that each channel band of the first separator plate is aligned with a respective channel band of the second plate so the coolant channels cooperatively distribute coolant fluid onto and vertically upward between the battery cells.

20 Claims, 6 Drawing Sheets (51) Int. Cl.
*H01M 10/613* (2014.01)
*H01M 10/6557* (2014.01)
*H01M 50/24* (2021.01)
*B60K 1/00* (2006.01)

(52) U.S. Cl.
CPC ......... *H01M 10/613* (2015.04); *H01M 50/24* (2021.01); *B60K 2001/005* (2013.01)

(56) References Cited

U.S. PATENT DOCUMENTS

| | | | |
|---|---|---|---|
| 6,955,063 B2 * | 10/2005 | Adiga | F28D 5/00 |
| | | | 62/304 |
| 8,329,325 B2 | 12/2012 | Brodie et al. | |
| 8,383,260 B2 * | 2/2013 | Essinger | H01M 10/647 |
| | | | 429/120 |
| 8,435,668 B2 * | 5/2013 | Kumar | H01M 10/6566 |
| | | | 429/162 |
| 8,563,154 B2 | 10/2013 | Graban et al. | |
| 8,852,772 B2 | 10/2014 | McDonald | |
| 10,003,112 B1 | 6/2018 | Boor et al. | |
| 10,923,287 B1 | 2/2021 | Coppola et al. | |
| 12,148,910 B2 * | 11/2024 | Onye | H01M 10/613 |
| 2009/0249807 A1 * | 10/2009 | Nemesh | B60H 1/00278 |
| | | | 62/117 |
| 2011/0200860 A1 * | 8/2011 | Brodie | B60L 1/003 |
| | | | 429/120 |
| 2019/0357386 A1 | 11/2019 | Coppola et al. | |
| 2022/0102780 A1 | 3/2022 | Hickey et al. | |

OTHER PUBLICATIONS

Han et al., Utility U.S. Appl. No. 17/743,630, filed May 13, 2022 (unpublished).

* cited by examiner

STACKED SEPARATOR PLATES WITH COOLANT FLOW DISTRIBUTION CHANNELS FOR LIQUID IMMERSION COOLING IN BATTERY ASSEMBLIES

INTRODUCTION

The present disclosure relates generally to electrochemical devices. More specifically, aspects of this disclosure relate to thermal management systems with liquid immersion cooling capabilities for regulating operating temperatures of battery assemblies.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds for desired ranges, contemporary traction battery packs group multiple battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

The individual cells of a battery pack may generate a significant amount of heat during the pack's charge and discharge cycles. This cell-borne heat is produced primarily by exothermic chemical reactions and losses due to activation energy, chemical transport, and resistance to ionic migration. Within lithium-ion batteries, a series of exothermic and gas-generating reactions may take place as cell temperatures rise that may push the battery assembly towards an unstable state. Such thermal events, if left unchecked, may lead to a more accelerated heat-generating state called "thermal runaway", a condition in which the battery system is unable to return the internal battery components to normal operating temperatures. An integrated battery cooling system may be employed to prevent these undesirable overheating conditions within such battery packs. Active thermal management (ATM) systems, for example, employ a central controller or dedicated control module to regulate operation of a cooling circuit that circulates coolant fluid through the heat-producing battery components. For indirect liquid cooling systems, a heat-transfer coolant is circulated through a network of internal channels, plates, and pipes within the battery case. In contrast, direct liquid cooling systems—or "liquid immersion cooling" (LIC)—immerse the battery cells/modules within a direct-conduction dielectric liquid coolant.

SUMMARY

Presented herein are thermal management systems using coolant flow distribution plates for immersion cooling of battery cells, methods for making and methods for operating such systems, and electric-drive vehicles equipped with such systems for cooling the vehicles' traction battery packs. In an example, a battery pack may contain multiple rows of electrically interconnected lithium-class pouch or prismatic battery cells. Interposed between some or all of the neighboring rows of these battery cells are mating separator plates with coolant flow distribution features for enhanced immersion cooling, e.g., to improve thermal performance during direct-current fast charging (DCFC) and track-driving conditions. For instance, the cell separator plates may be cut from aluminum sheet metal and perforated with multiple rows of mutually parallel 45-degree channels. Two of the separator plates are then stacked in face-to-face abutting relation with each other such that each row of angled channels of one plate, e.g., having a forward pitch, aligns with at least one row of angled channels of the other plate, e.g., having a rearward pitch, to form a crisscrossed channel pattern. The abutting separator plates improve active cooling by distributing LIC coolant across multiple surfaces of the battery cells. Alternative separator sheet designs may employ other thermally conductive materials, such as steel and copper, and different channel designs, such as columns of mutually parallel apertures, as well as incorporate turbulators for improved heat transfer in laminar regimes.

Attendant benefits for at least some of the disclosed concepts include battery assemblies with stacked cell separator plates having enhanced coolant flow distribution channels that provision multi-surface LIC of battery cells. The separator plates' perforated channels cooperatively enlarge the wetted surface area contacted by the LIC coolant and increase temperature uniformity across the battery cells with the crisscross channel design. Improving the cooling capabilities of pouch and prismatic battery cells helps to improve fast-charging and C-rate battery power performance of the cells as well as to increase the battery life. The stacked cell separator plates provide pressure uniformity and LIC coolant flow uniformity across the cell faces, which helps to reduce system packaging size. In addition to improved battery power performance and reduced packaging space requirements, cooling efficacy is improved with a concomitant increase in battery capacity, which leads to improvements in overall vehicle efficiency and increased driving range.

Aspects of this disclosure are directed to thermal management systems with intercell coolant flow distribution plates for liquid immersion cooling (LIC) of battery cells, which may be implemented for both automotive and non-automotive applications alike. In an example, there is presented a battery assembly that contains multiple battery cells, such as lithium-class (secondary) pouch or prismatic battery cells, that are arranged in adjacent cell rows. These battery cells are stored inside a protective battery housing that includes inlet and outlet fluid ports that respectively receive and evacuate therethrough coolant fluid, such as dielectric LIC liquid. Located between one or more of the neighboring cell rows is a pair of separator plates, each of which includes multiple coolant channels that are arranged in adjacent channel bands. The separator plates are in face-to-face contact with each other such that each channel band of one separator plate is aligned with one or more channel bands of the other separator plate so the coolant channels cooperatively distribute coolant fluid onto and vertically upward between the battery cells.

Additional aspects of this disclosure are directed to motor vehicles with LIC-type thermal management systems for cooling lithium-class traction battery packs. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, e-bikes, etc. For non-automotive applications, disclosed concepts may be implemented for any logically relevant use, including stand-alone power stations and portable power packs, photovoltaic systems, pumping equipment, machine tools, server systems, etc. While not per se limited, disclosed concepts may be particularly advantageous for use with lithium-class prismatic and pouch-type traction battery packs.

In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle. A rechargeable traction battery pack is mounted onto the vehicle body and operable to power the traction motor(s). In addition to the battery pack and traction motor, the vehicle includes other heat-generating devices that may be cooled by disclosed in-vehicle thermal management systems.

Continuing with the preceding discussion, the traction battery pack includes a protective battery pack housing that contains multiple rows of lithium-class pouch or prismatic battery cells. This battery pack housing includes multiple side walls that are substantially parallel to the battery cells, a base plate adjoining the sidewalls and subjacent the battery cells, and inlet and outlet fluid ports that receive and evacuate therethrough coolant fluid. A pair of separator plates is located between one or more of the neighboring pairs of cell rows, oriented substantially orthogonal to the base plate. Each separator plate defines therein multiple coolant channels that are arranged in mutually parallel channel bands. The separator plates are packaged in face-to-face contact with each other such that each channel band of one of the separator plates is aligned with one or more of the channel bands of the other separator plate so the coolant channels cooperatively distribute coolant fluid onto and vertically upward between the battery cells.

Aspects of this disclosure are also directed to manufacturing workflow processes, computer-readable media, and control logic for making or for using any of the disclosed thermal management systems, battery assemblies, and/or motor vehicles. In an example, a method is presented for constructing a battery assembly. This representative method includes, in any order and in any combination with any of the above and below disclosed options and features: arranging a plurality of battery cells in a first cell row and a second cell row; storing the battery cells in a battery housing, the battery housing including inlet and outlet fluid ports configured to respectively receive and evacuate therethrough coolant fluid; locating first and second separator plates between the first and second cell rows, the first and second separator plates each defining therein multiple coolant channels arranged in adjacent channel bands; and placing the first and second separator plates in face-to-face contact with each other such that each of the channel bands of the first separator plate is aligned with one or more of the channel bands of the second separator plate to cooperatively distribute the coolant fluid onto and vertically upward between the battery cells.

For any of the disclosed battery assemblies, methods, and vehicles, the coolant channels of one (first) separator plate may be oriented at a distinct (first) oblique angle with respect to the base plate, whereas the coolant channels of the other (second) separator plate may be oriented at another (second) distinct angle with respect to the base plate. In a more specific, yet non-limiting example, the (first) oblique angle of the coolant channels of one plate may be approximately 45 degrees, whereas the (second) oblique angle of the coolant channels of the other plate may be approximately 135 degrees. As another option, the channel bands may be arranged in mutually parallel rows that are oriented substantially parallel to the base plate of the battery housing. Each coolant channel may be fabricated as an elongated, recessed groove that contains multiple through-holes, each of which extends through the separator plate.

For any of the disclosed battery assemblies, methods, and vehicles, each of the separator plates may be formed as a unitary, single-piece structure from an elongated and substantially flat metallic sheet. As another option, the battery assembly may insert fluid-dynamic turbulators into gaps between the battery housing and the battery cells. These turbulators convert laminar coolant fluid flow in these gap regions to turbulent coolant flow. Each of the turbulators may be an elongated, helical structure that is located adjacent and substantially parallel to the separator plates. As noted above, the battery housing may include multiple sidewalls that adjoin a cover plate and a base plate, the latter of which is located underneath the battery cells and separator plates. In this instance, the cell rows, the separator plates, and the sidewalls may be substantially mutually parallel to one another. The battery housing may also include a cooling plate that is seated on the base plate and includes multiple coolant feed channels that distribute coolant fluid along the bottom edges of the battery cells. In this instance, a conical flow-distribution manifold in the base plate fluidly connects the housing's inlet fluid port to the coolant feed channels in order to transmit coolant fluid from the inlet port to the individual feed channels.

For any of the disclosed battery assemblies, methods, and vehicles, the separator plate coolant channels may be oriented substantially parallel to one another and to the base plate. Each of the coolant channels may be a rectangular through-hole that extends through the separator plate. In this instance, the channel bands may be arranged in mutually parallel columns that are oriented substantially perpendicular to the battery housing's base plate. Each of these parallel columns may include a recessed vertical channel that extends substantially orthogonally from the base plate.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Discussed below are liquid immersion cooling (LIC) system architectures for regulating the operating temperatures of battery cells using dual intercell separator plates to optimize coolant fluid flow and distribution. In a non-limiting example, two perforated aluminum panels are stacked in face-to-face contact with each other and placed between neighboring cell rows (e.g., between adjacent pouch cells or adjacent lines of prismatic cells). The major faces of the panels are machined with 45-degree coolant channel grooves—one panel having grooves with a forward pitch (+45°±5 from horizontal) and the other panel having grooves with a rearward pitch (135°±5 or −45°±5 from horizontal). The two panels, when stacked together, form a three-dimensional zigzag pattern of interconnected channels that creates a pressure differential that forces dielectric LIC coolant to flow vertically upward across the panels. Each aluminum panel may be perforated with through-holes that are located inside the grooves to allow coolant to flow through the plate. Paired coolant flow distribution plates may be placed between one, some, or all neighboring cell rows. Some or all of the coolant channel grooves may have the same length, shape, and depth, or some grooves may have distinct lengths/shapes/depths. Moreover, the dimensions, material, method of fabrication, and/or geometry of the plates and channels may be varied for different intended applications.

A conical fluid-distribution manifold is located near the battery assembly's coolant inlet; the manifold connects the housing's inlet port(s) to individual base plate runners that evenly distribute the dielectric coolant to base plate feed channels underneath the cells. These feed channels have fluid paths for coolant to flow onto and upwards across the intercell plates to direct coolant into direct contact with the cells and cell tabs. Located above the battery cells are base plate return channels to provision coolant flow along the top edges of the cells and evacuation of the coolant through the battery assembly's coolant exhaust. This stacked intercell separator plate design enables more uniform and efficient cooling of the two major faces, four edges, and tabs of the pouch/prismatic cells. Multiple bi-directional flow inlets into the stacked separator plates produces coolant flow mixing for improved heat transfer and lower, uniform cell temperatures. In addition to direct immersion cooling over all cell faces and edges, the plates may also act as heat sinks and provide pressure distribution uniformity across the cell faces. Optional turbulator inserts incorporated in the feed and/or return channels improve immersion cooling characteristics by disrupting laminar boundary layers and promoting more fluid contact with cell surfaces.

Figure 1:
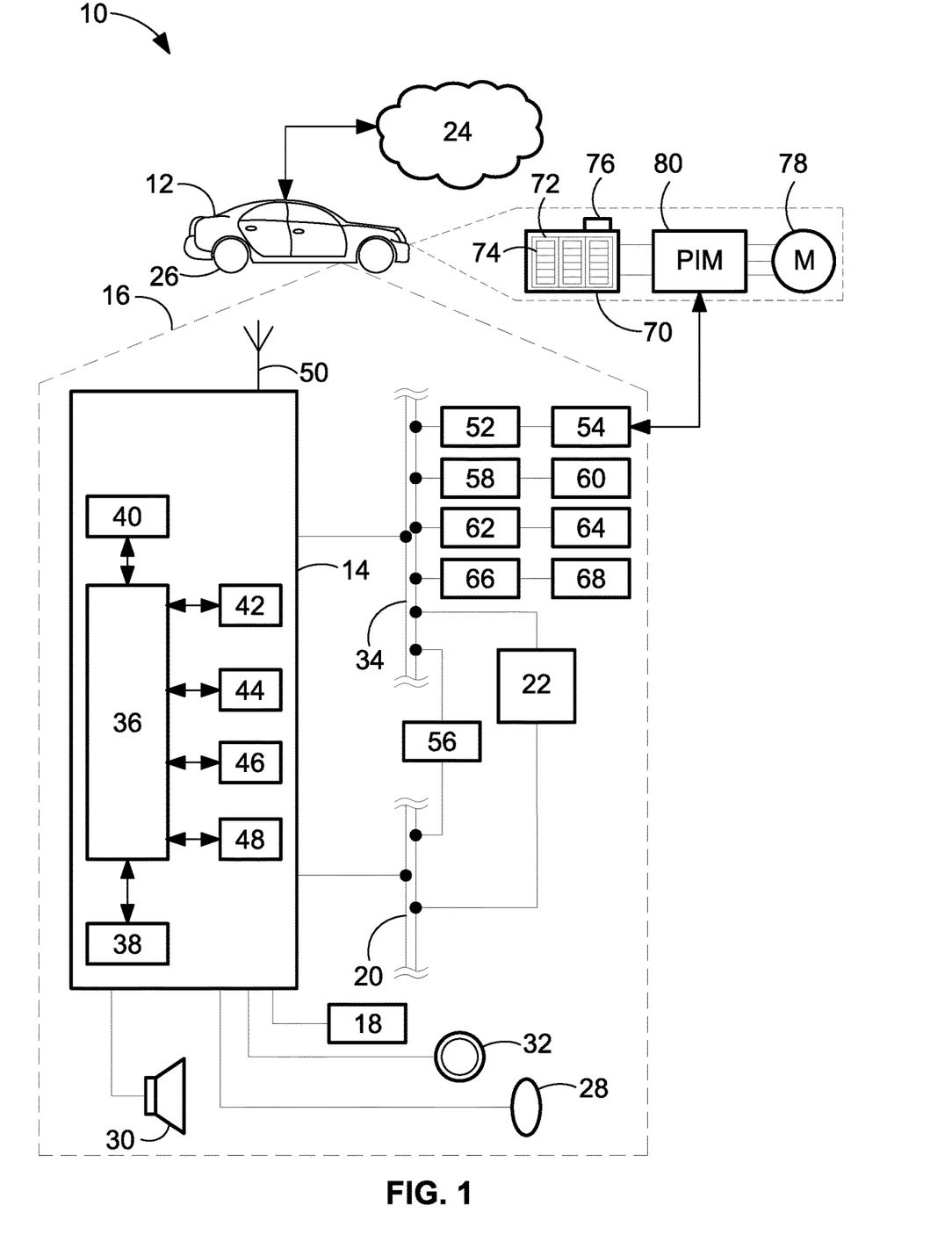
FIG. 1 is a partially schematic, side-view illustration of a representative motor vehicle with an electrified powertrain, a rechargeable traction battery pack, and a thermal management system with LIC capabilities for regulating the operating temperatures of the cells in the traction battery pack in accordance with aspects of the present disclosure.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of vehicle, and utilized for both automotive and non-automotive applications alike. Moreover, only select components of the motor vehicles, battery assemblies, and LIC systems are shown and described in additional detail herein. Nevertheless, the vehicles, assemblies, and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, touchscreens, joysticks, pedals, etc.). These hardware components 16 may function as a human/machine interface (HMI) that enables a user to communicate with the telematics unit 14 and other components resident to and remote from the vehicle 10. The microphone 28, for instance, provides occupants with a means to input verbal or other auditory commands. Conversely, a speaker 30 provides audible output to a vehicle occupant and may be either a stand-alone speaker dedicated for use with the telematics unit 14 or may be part of an audio system 22. The audio system 22 is connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating a brake system, regulating charge and discharge of a vehicle battery pack, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a wireless modem, or a navigation and location chipset/component (e.g., global positioning system (GPS) transceiver), all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The powertrain is generally represented in FIG. 1 by an electric traction motor (M) 78 that is operatively connected to a rechargeable energy storage system (RESS), which may be in the nature of a chassis-mounted traction battery pack 70. The traction battery pack 70 of FIG. 1 employs one or more battery modules 72, each of which contains a group of battery cells 74, such as stacked lithium-class, zinc-class, nickel-class, or organosilicon-class battery cells of the prismatic, pouch, or cylindrical type. One or more prime movers, such as traction motor (M) 78, draw electrical power from and, optionally, deliver electrical power to the battery pack 70. A power inverter module (PIM) 80 electrically connects the battery pack 70 to the motor(s) 78 and modulates the transfer of electrical current therebetween. Disclosed concepts are similarly applicable to HEV and ICE-based powertrains. Module management, cell sensing, and module-to-module or module-to-host communication functionality may be integrated directly into each battery module 72 and performed by an integrated electronics package, such as a wireless-enabled cell monitoring unit (CMU) 76.

Figure 2:
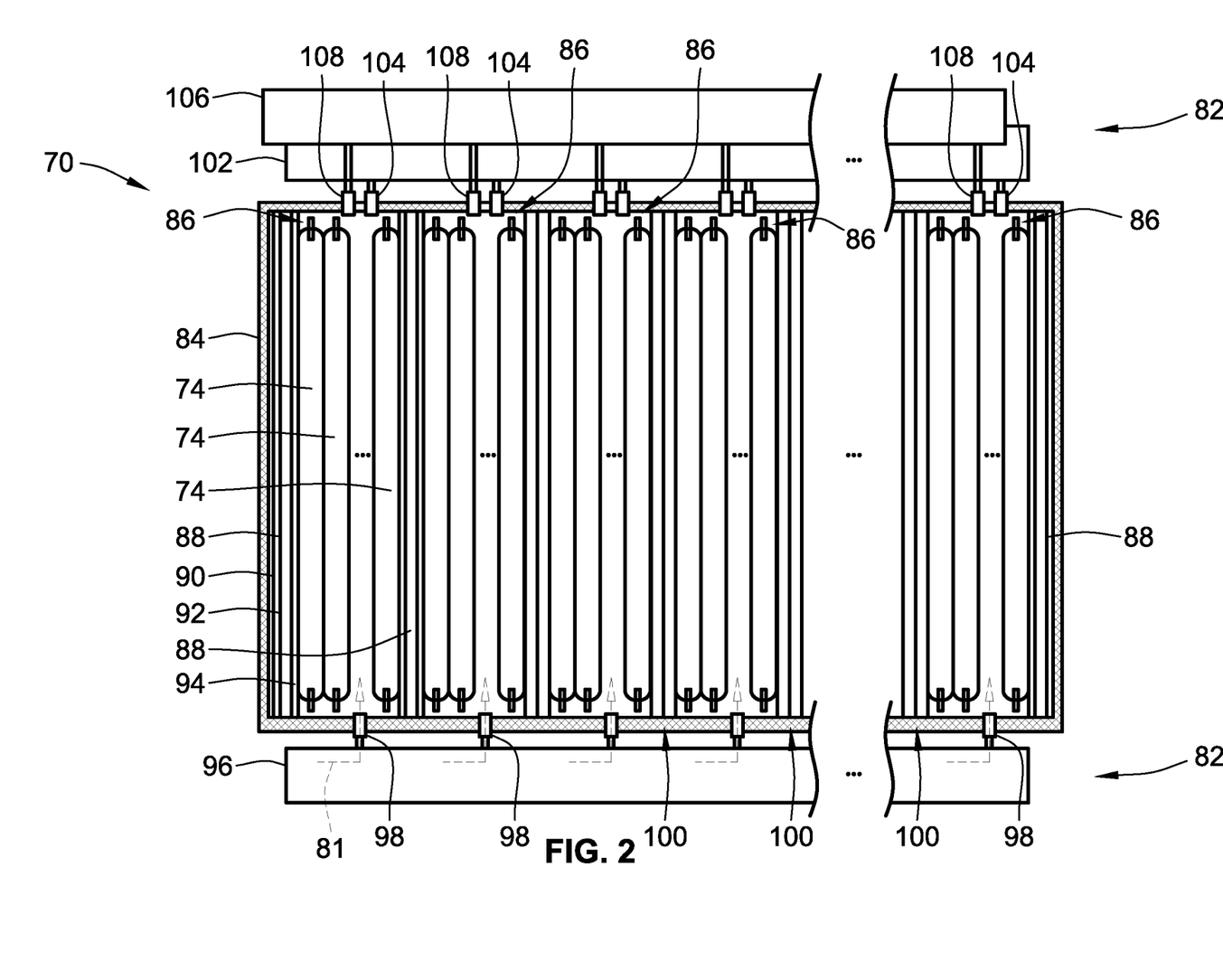
FIG. 2 is a schematic, plan-view illustration of the representative traction battery pack of FIG. 1 with an LIC system using stacked cell separator plates with coolant flow distribution channels for regulating the operating temperatures of lithium-class pouch cells.

Presented in FIG. 2 is a schematic, plan-view illustration of the traction battery pack 70 of FIG. 1 with an example of a liquid immersion cooling system 82 for selectively submerging the battery cells 74 in a dielectric liquid cooling agent (represented by dashed arrow 81). In FIG. 2, the vehicle's traction battery pack 70, which is provided as a non-limiting example of a "battery assembly", includes a fluid-tight and electrically insulated protective battery housing 84 that encloses therein multiple lithium-class, pouch-type battery cells 74 that are arranged in mutually parallel cell rows 86. When installed into the battery housing 84, the battery cells 74 may be stacked in side-by-side facing relation to each other and may optionally be compressed between insulating cell dividers 88. In the illustrated example, each of these cell dividers 88 includes a first metal divider plate 90, an insulating barrier 92, and a second metal divider plate 94. In addition to or as a replacement for the cell dividers 88, one or more stacked pairs 100 of coolant flow distribution plates may be sandwiched between and physically separate one or more of the neighboring rows 86 of battery cells 74.

Figure 3:
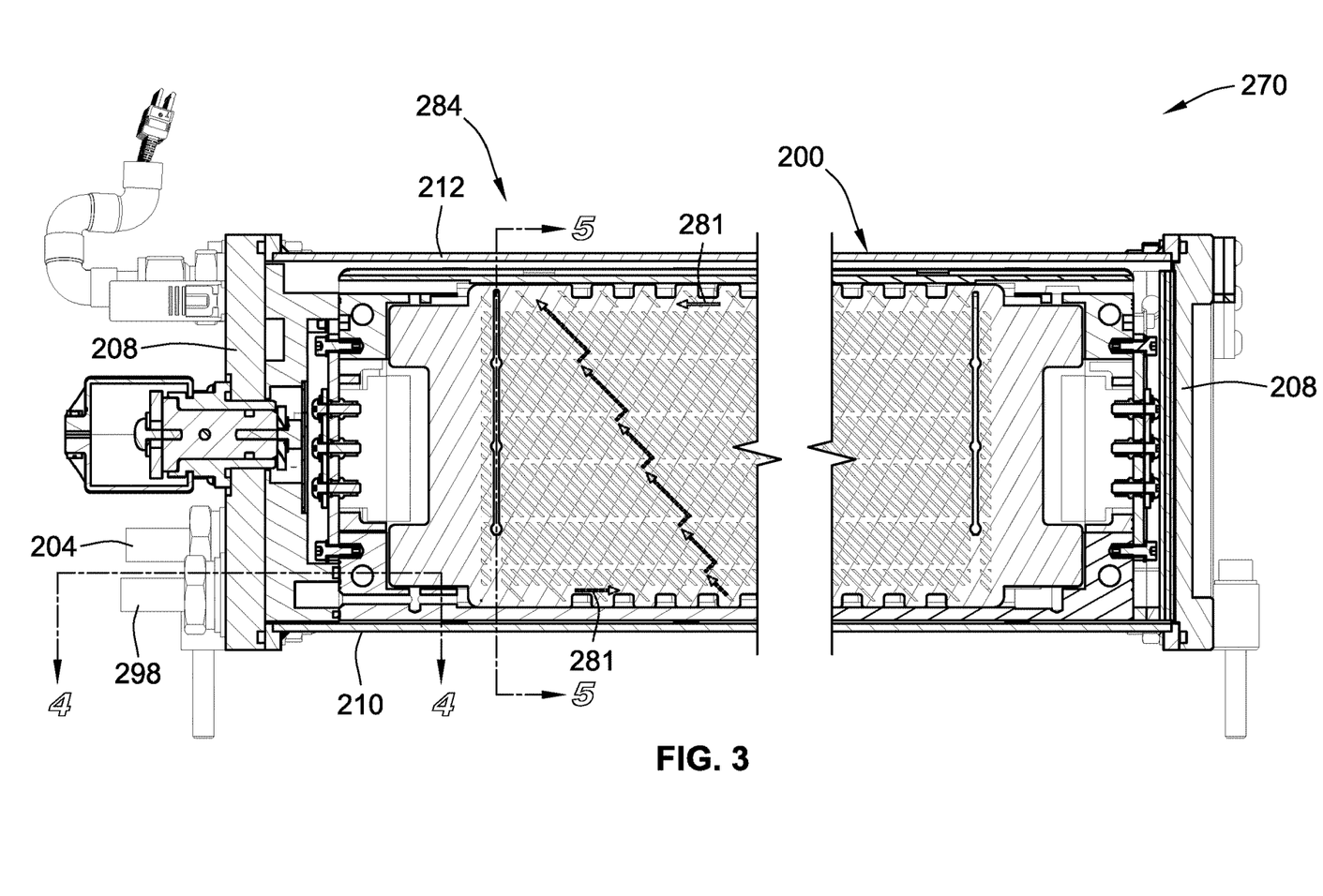
FIG. 3 is a sectional, side-view illustration of another representative battery assembly with an LIC system using stacked cell separator plates with coolant flow distribution channels to immersion cool battery cells in accordance with aspects of the present disclosure.

To facilitate active thermal management of the traction battery pack 70, e.g., during a thermal runaway event, DCFC pack charging, extreme driving conditions, etc., the LIC system 82 employs a coolant intake manifold 96 to supply the dielectric LIC coolant 81 to the battery housing 84 via a series of coolant inlet ports 98. During immersion cooling, a coolant exhaust manifold 102 evacuates heated dielectric coolant 81 from the battery housing 84 via a series of coolant outlet ports 104. At the same time, a gas manifold 106 receives and removes vent gases from the battery housing 84 via a series of gas conduits 108. The battery housing 84 may be equipped with multiple inlet and outlet ports 98, 104 (as seen in FIG. 2) or may utilize a single inlet port and a single outlet port (as seen in FIG. 3). Moreover, the coolant intake and exhaust manifolds 96, 102 may be packaged at opposing ends of the battery housing 84 (as seen in FIG. 2) or may both be packaged at the same end of the housing 84 (as seen in FIG. 3).

Figure 4:
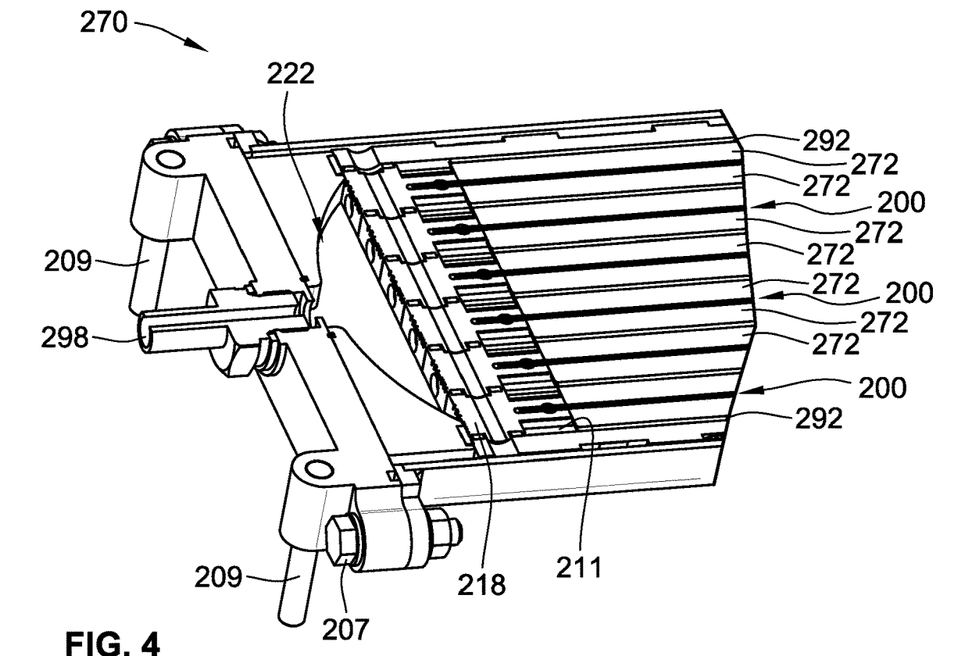
FIG. 4 is an enlarged, perspective-view illustration of a proximal end of the representative battery assembly and LIC system of FIG. 3 taken along line 4-4.
Figure 5:
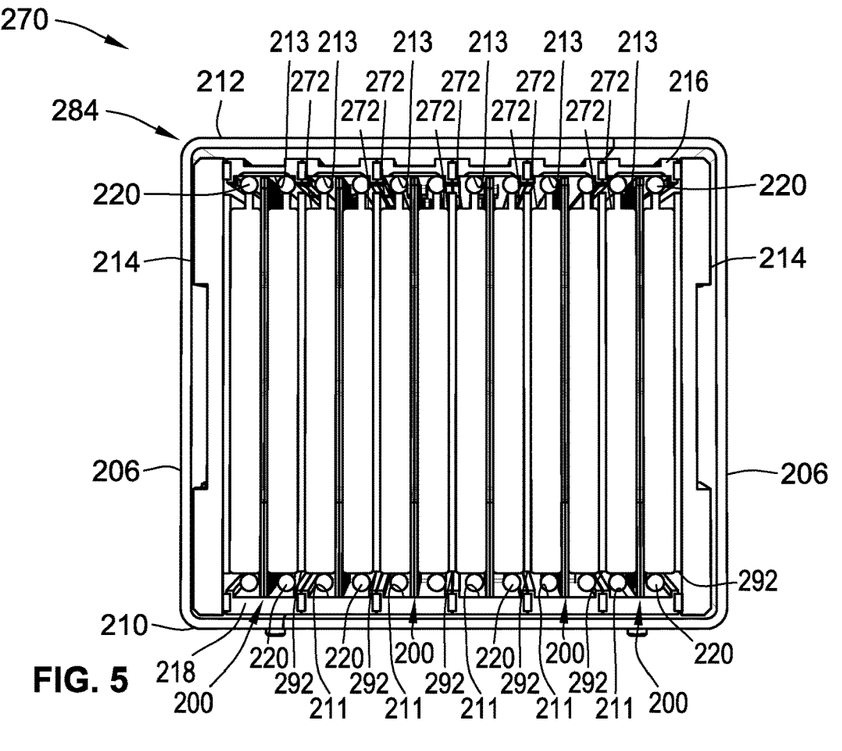
FIG. 5 is an enlarged, end-view illustration of the representative battery assembly and LIC system of FIG. 3 taken along line 5-5.

Turning next to FIG. 3, there is shown another non-limiting example of a multicell battery assembly 270 with an active thermal management (ATM) system that uses intercell coolant flow distribution plates 200 for immersion cooling of battery cells 272. Although differing in appearance, it is envisioned that any of the features and options described with reference to the traction battery pack 70 of FIGS. 1 and 2 may be incorporated, singly or in any combination, into the battery assembly 270 of FIGS. 3-5, and vice versa. As a point of similarity, the battery assembly 270 of FIG. 3 includes a fluid-tight and electrically insulated protective battery housing 284 that contains a stack of lithium-class, pouch-type battery cells 272, which are arranged in mutually parallel rows (e.g., 12 cell rows with a single pouch cell in each row). A series of electrical insulating barrier sheets 292 is interleaved between the rows of battery cells 272. The battery housing 284 is shown in FIGS. 3 and 5 as a rectangular polyhedron with: a pair of rectangular sidewalls 206 (FIG. 5) on opposing lateral sides of the housing 284; a pair of square end covers 208 (FIG. 3) on opposing longitudinal ends of the housing 284; a base plate 210 subjacent the battery cells 272; and a cover plate 212 extending across the tops of the battery cells 272. The battery housing 284 may be constructed of a metallic, polymeric, or fiber-reinforced polymer (FRP) material, including combinations thereof, to satisfy various mechanical, manufacturing, and thermal design specifications.

Two structurally reinforcing end plates 214 are located on opposing lateral sides of the battery cells 272, interposed between the cells 272 and the sidewalls 206. Coolant transmitting top and bottom cooling plates 216 and 218, respectively, are located above and below the battery cells 272, interposed between the cells 272 and the base/cover plates 210, 212. In the illustrated example, the sidewalls 206, base plate 210, and cover plate 212 are formed as a single-piece structure from metal sheet stock. The end covers 208 are fabricated as discrete components that are then sealed and fastened to longitudinal ends of the sidewalls 206, e.g., via bolts 207 of FIG. 4, and mounted onto a support structure, e.g., via bolts 209, such as a battery tray. Once assembled, the rows of battery cell 272, the separator plates 200, the housing sidewalls 206, and the end plates 214 are all substantially mutually parallel to one another. In the same vein, the base plate 210, the cover plate 212, the top coolant plate 216 and the bottom coolant plate 218 are all substantially mutually parallel to one another and substantially orthogonal to the cells 272, separator plates 200, and sidewalls 206. It should be appreciated that the battery assembly 270 may include greater or fewer battery cells, which may take on similar or alternative form factors. The battery housing 284 may also take on different constructions, geometries, and materials without departing from the scope of this disclosure.

To help maintain normal cell operating temperatures and stop or preclude high-heat thermal events, such as thermal runaway of one or more battery cells, the battery assembly 270 of FIG. 3 is equipped with an active quenching system (AQS) of the liquid immersion cooling type. The battery housing 284 of FIG. 3, for example, employs a coolant inlet port 298 that receives therethrough dielectric LIC coolant 281 (e.g., from coolant intake manifold 96 of FIG. 2), and a coolant outlet port 204 that evacuates therethrough the coolant fluid 281 (e.g., to coolant exhaust manifold 102 of FIG. 2). Seated on the base plate 210 is a bottom cooling plate 218 with a series of laterally spaced coolant feed channels 211 that extends longitudinally along the length of the battery housing 284 and distributes coolant 281 along the bottom edges of the battery cells 272. Extending across the tops of the battery cells 272 is a top cooling plate 216 with a series of laterally spaced coolant exhaust channels 213 that extends longitudinally along the length of the battery housing 284 and distributes coolant 281 along the top edges of the cells 272. A conical flow-distribution manifold 222 fluidly connects the housing's coolant inlet port 298 to the coolant feed channels 211 and thereby transmits coolant 281 to the individual feed channels 211. With this architecture, chilled dielectric LIC coolant 281 enters the battery housing 284 through the inlet port 298, passes through the manifold 222 to the feed channels 211, through the feed channels 211 to the unported (distal) end cover 208 and up across the coolant flow distribution plates 200, and through the exhaust channels 213 to the ported (proximal) end cover 208 whereat spent coolant 281 exits of the housing 284 through the exhaust port 204.

To improve cooling along the top and bottom edges of the battery cells 272, a series of laterally spaced turbulators 220 (FIG. 5) may be disposed between the cells 272 and housing 284, e.g., located within the coolant feed and exhaust channels 211, 213. In the illustrated example, a turbulator 220 extends across both the top and bottom edges of each battery cell 272 (e.g., 24 turbulators for 12 cells). These turbulators 220 are designed to convert laminar coolant flow within the coolant channels 211, 213 to turbulent fluid flow, for example, by altering the coolant flow path, reducing the boundary layer, and increasing fluid contact with the channel walls. Each turbulator 220 may be fabricated as an elongated, helical structure (e.g., spring turbulator, twisted-tape turbulator, twisted-wire turbulator, etc.) that is located adjacent and substantially parallel to the separator plates 200. Slots, latches, fasteners, etc., may be employed to couple opposing ends of the turbulators 220 to the cooling plates 216 and 218. It is also within the scope of this disclosure to provide greater or fewer turbulators packaged at similar or alternative locations than what are shown in FIG. 5. As an example, vertically oriented turbulators may be placed at opposing longitudinal ends of the battery cells 272, substantially parallel to the end covers 208.

Interposed between some or all of the neighboring rows of battery cells 272 are mated pairs 200 of coolant-flow-enhancing separator plates 224 and 226 (FIGS. 6 and 7) with coolant flow distribution features for enhanced immersion cooling. In the example shown in FIG. 5, there are six (6) pairs 200 of (first and second) intercell separator plates 224, 226, with each pair stacked together and inserted between two neighboring (first and second) rows of the pouch-type battery cells 272. Arranged from left to right, in parallel abutting relation, there are: a barrier sheet 292, a cell 272, a separator plate pair 200, and another cell 272; these four "layers" may define a stacked cell subassembly with the battery assembly 270 of FIG. 5 containing six such subassemblies stacked side-by-side with one another. It is envisioned that the battery assembly 270 may include greater or fewer mated pairs 200 of the separator plates 224, 226.

Figure 6:
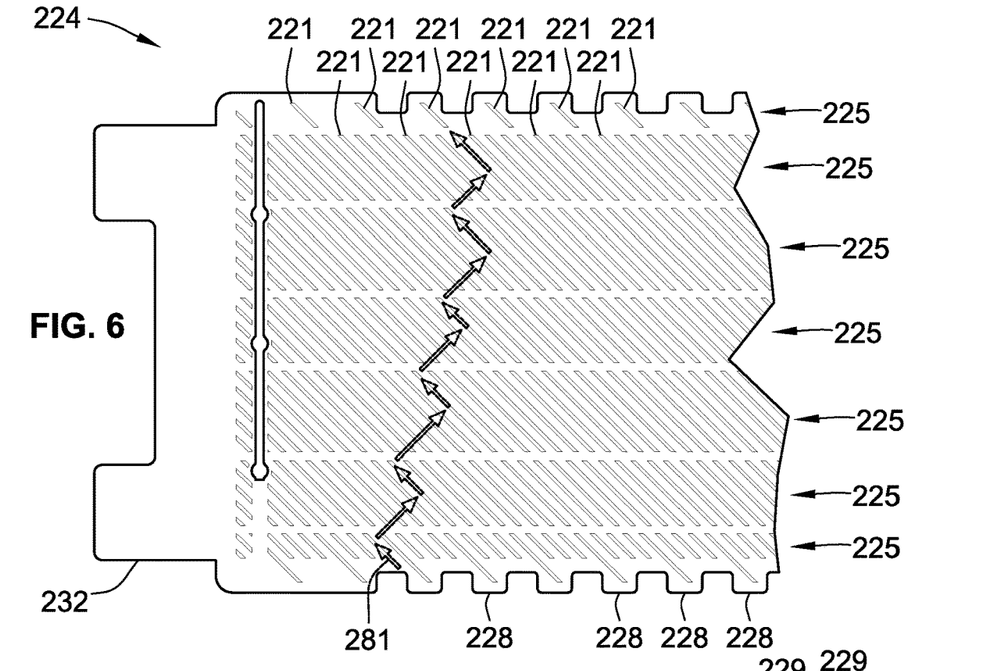
FIG. 6 is a side-view illustration of an end portion of one of the representative cell separator plates with coolant flow distribution channels of FIG. 3.
Figure 7:
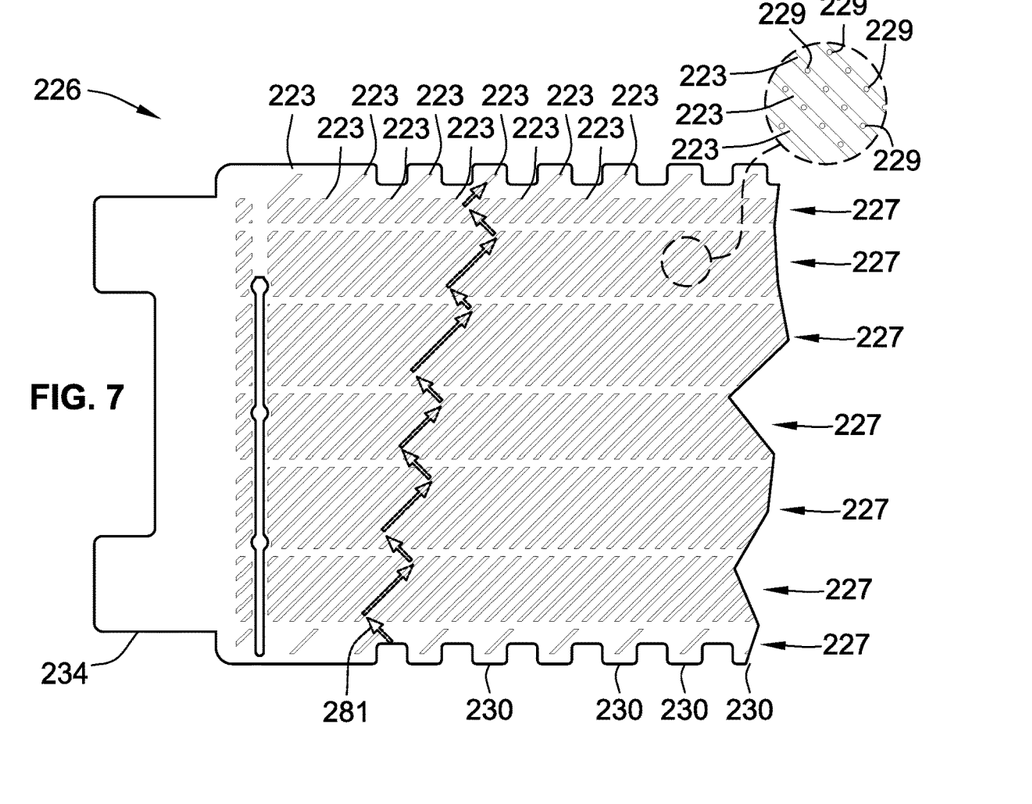
FIG. 7 is a side-view illustration of an end portion of the other one of the representative cell separator plates with coolant flow distribution channels of FIG. 3.

With reference to both FIGS. 6 and 7, each of the separator plates 224, 226 may be formed as a unitary, single-piece structure from an elongated and substantially flat metallic sheet. For instance, the separator plates 224, 226 may be sheared or stamped from aluminum blanks or sheet stock, and then precision machined and pierced to include the desired coolant flow distribution features. For simplicity of design and ease of manufacture, the separator plates 224, 226 may be substantially structurally identical to one another. As another option, the separator plates 224, 226 may be fabricated with mounting tabs 228 and 230 that project vertically from top and bottom edges of the plates and insert into mating slots within the top and bottom cooling plates 216, 218 to facilitate mounting of the separator plates 224, 226 within the battery housing 284 and to align the plates 224, 226 with each other. U-shaped mounting flanges 232 and 234 may project from opposing longitudinal ends of the separator plates 224, 226 to further facilitate mounting of the plates 224, 226 within the battery housing 284 and to also facilitate lateral alignment within the housing 284.

To improve active cell cooling by helping to distribute coolant fluid onto all edges and faces of the battery cells 272, each separator plate 224, 226 is manufactured with multiple successions of coolant channels 221 and 223 that are arranged into adjacent channel bands 225 and 227. These channel bands 225, 227 may be arranged into mutually parallel, rectilinear rows that are spaced vertically from one another and extend longitudinally along the length of the plates 224, 226. In this instance, the channel bands 225, 227 are oriented substantially parallel to the base and cover plates 210, 212 of the battery housing 284. As shown, each separator plate 224, 226 contains seven (7) rectilinear bands or rows 225, 227 of multiple coolant channels 221, 223. While not per se required, each channel band 225, 227 may contain as few as twenty (20) to forty (40) channels (e.g., about 32 channels) or as many as one hundred (100) to one hundred fifty (150) channels (e.g., about 125 channels). It is envisioned that the separator plates 224, 226 may each contain greater or fewer channel bands 225, 227, which may contain greater or fewer channels 221, 223 and may be arranged in non-linear and non-horizontal patterns.

As best seen in FIGS. 6 and 7, each of the coolant channels 221, 223 is an elongated, rectilinear groove that is recessed into one of the major faces of the separator plate 224, 226. Some of the channel bands 225, 227 may contain channels 221, 223 that share the same length, width, and depth, whereas some of the channel bands 225, 227 may contain channels 221, 223 with distinct lengths, widths, and/or depths. The coolant channels 223 of one of the separator plates 226 may be oriented at a distinct oblique angle with respect to the base and cover plates 210, 212, whereas the coolant channels 221 of the other separator plate 224 may be oriented at another distinct oblique angle with respect to the base and cover plates 210, 212. By way of example, and not limitation, the oblique angle of the coolant channels 223 in the coolant plate 226 of FIG. 7 may be approximately 45 degrees from horizontal, whereas the oblique angle of the coolant channels 221 in the coolant plate 224 of FIG. 6 may be approximately 135 degrees from horizontal. To allow coolant to flow through the separator plate 224, 226, some or all of the coolant channels 221, 223 may contain a single or multiple through-holes 229 (see inset view of FIG. 7) that extend transversely through the separator plates 224, 226. It is envisioned that the coolant channel grooves may take on different lengths, shapes, depths and angles from what are shown in the drawings without departing from the intended scope of this disclosure.

When installed into the battery assembly 270, the two separator plates 224, 226 are stacked in face-to-face contact with each other such that each of the channel bands 225 of one of the separator plates 224 is aligned with at least one of the channel bands 227 of the other separator plate 226. In so doing, the channels 221 and 223 align and overlap to form a crisscrossed channel pattern that draws dielectric LIC coolant 281 vertically upward across the battery cells 272. Put another way, abutting the separator plates 224, 226 forms a three-dimensional zigzag pattern of interconnected channels that creates a pressure differential that forces dielectric coolant 281 to flow upward from the bottom cooling plate 218 to the top cooling plate 216. As coolant 281 flows vertically upward across the major faces of the separator plates 224, 226, coolant 281 will also pass through the coolant through-holes 229 in the channel grooves and onto the major faces of the battery cells 272.

Figure 8:
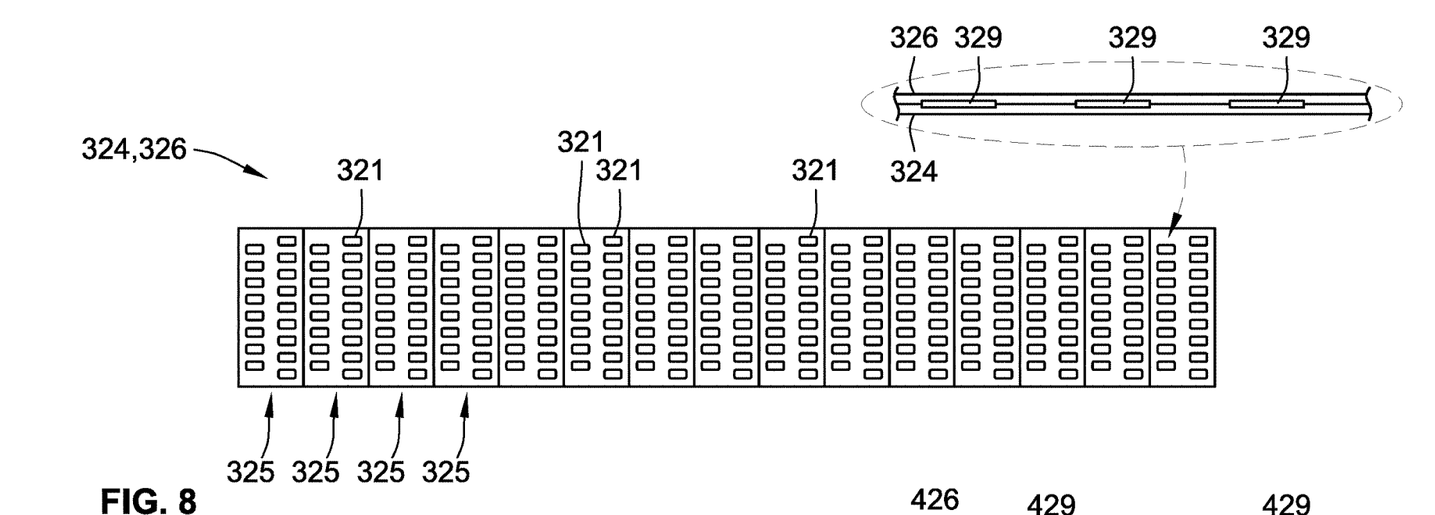
FIG. 8 is a side-view illustration of another example of a cell separator plate with coolant flow distribution channels in accord with aspects of the disclosed concepts.
Figure 9:
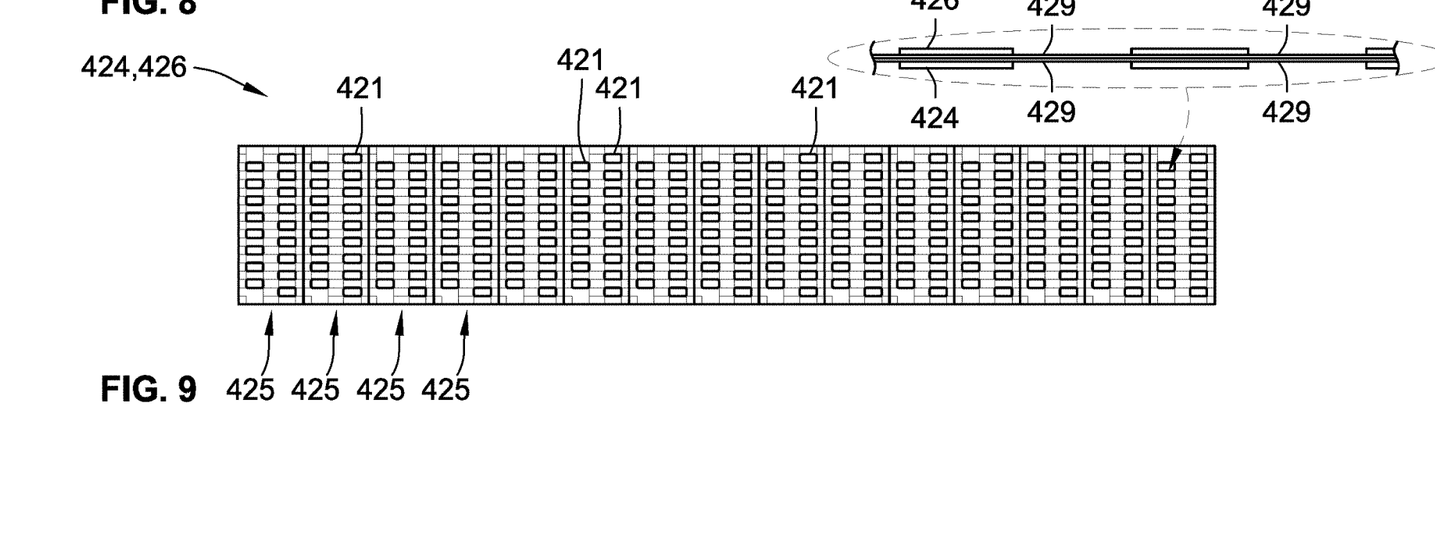
FIG. 9 is a side-view illustration of yet another example of a cell separator plate with coolant flow distribution channels in accord with aspects of the disclosed concepts.

FIGS. 8 and 9 are side-view illustrations of other examples of cell separator plates 324 and 326 (FIG. 8) and 424 and 426 (FIG. 9) with optional coolant flow distribution channels in accordance with embodiments of this disclosure. In both FIGS. 8 and 9, coolant channels 321 and 421 include rectangular through-holes that are substantially parallel to one another and with both the base plate 210 and the cover plate 212. Moreover, the coolant channels 321, 421 are vertically aligned within channel bands 325 and 425, which are arranged in mutually parallel columns and oriented substantially perpendicular to the base and cover plates 210, 212 of the battery housing 272. As shown in the inset views of FIGS. 8 and 9, each of the channel bands 325, 425 may also include one or more recessed vertical channels 329 and 429 that are oriented substantially orthogonal to the base plate 210 and the cover plate 212.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A battery assembly comprising:
   a plurality of battery cells arranged in a first cell row and a second cell row;
   a battery housing storing therein the battery cells and including inlet and outlet fluid ports configured to respectively receive and evacuate therethrough a coolant fluid; and
   first and second separator plates located between the first and second cell rows and each defining therein multiple coolant channels arranged in adjacent channel bands, the first and second separator plates being in face-to-face contact with each other such that each of the channel bands of the first separator plate is aligned with one or more of the channel bands of the second separator plate to cooperatively distribute the coolant fluid onto and vertically upward between the battery cells.

2. The battery assembly of claim 1, wherein the battery housing includes a base plate subjacent the battery cells and the first and second separator plates, and wherein the coolant channels of the first separator plate are oriented at a first oblique angle with respect to the base plate, and the coolant channels of the second separator plate are oriented at a second oblique angle, distinct from the first oblique angle, with respect to the base plate.

3. The battery assembly of claim 2, wherein the first oblique angle is approximately 45 degrees and the second oblique angle is approximately 135 degrees.

4. The battery assembly of claim 2, wherein the channel bands are arranged in mutually parallel rows oriented substantially parallel to the base plate of the battery housing.

5. The battery assembly of claim 2, wherein the coolant channels are elongated grooves containing multiple through-holes extending through the first and second separator plates.

6. The battery assembly of claim 1, wherein each of the first and second separator plates is formed as a single-piece structure from an elongated and substantially flat metallic sheet.

7. The battery assembly of claim 1, further comprising a plurality of turbulators disposed in gaps between the battery housing and the battery cells, each of the turbulators being configured to convert a laminar flow of the coolant fluid to a turbulent flow.

8. The battery assembly of claim 7, wherein each of the turbulators is an elongated helical structure located adjacent and substantially parallel to the first and second separator plates.

9. The battery assembly of claim 1, wherein the battery housing includes first and second sidewalls adjoining a base plate subjacent the battery cells and the first and second separator plates, wherein the first and second cell rows, the first and second separator plates, and the first and second sidewalls are substantially mutually parallel to one another.

10. The battery assembly of claim 9, further comprising a cooling plate seated on the base plate and including a plurality of coolant feed channels configured to distribute the coolant fluid along bottom edges of the battery cells, the base plate including a flow-distribution manifold fluidly connecting the inlet fluid port and the coolant feed channels and configured to transmit the coolant fluid to each of the coolant feed channels.

11. The battery assembly of claim 1, wherein the battery housing includes a base plate adjoining the battery cells and the first and second separator plates, and wherein the coolant channels of the first and second separator plates are substantially parallel to one another and to the base plate.

12. The battery assembly of claim 11, wherein the channel bands are arranged in mutually parallel columns oriented substantially perpendicular to the base plate of the battery housing.

13. The battery assembly of claim 12, wherein each of the parallel columns defines a recessed vertical channel oriented substantially orthogonal to the base plate.

14. The battery assembly of claim 11, wherein the coolant channels are rectangular through-holes extending through the first and second separator plates.

15. A motor vehicle, comprising:
    a vehicle body with a passenger compartment;
    a plurality of road wheels attached to the vehicle body;
    a traction motor attached to the vehicle body and operable to drive one or more of the road wheels to thereby propel the motor vehicle; and
    a traction battery pack attached to the vehicle body and electrically connected to the traction motor, the traction battery pack including:
    a plurality of battery cells arranged in mutually parallel first and second cell rows;
    a battery housing storing therein the battery cells, the battery housing including multiple side walls substantially parallel to the battery cells, a base plate adjoining the sidewalls and subjacent the battery cells, and inlet and outlet fluid ports configured to respectively receive and evacuate therethrough a coolant fluid; and first and second separator plates located between the first and second cell rows and substantially orthogonal to the base plate, each of the separator plates defining therein multiple coolant channels arranged in mutually parallel channel bands, the first and second separator plates being in face-to-face contact with each other such that each of the channel bands of the first separator plate is aligned with one or more of the channel bands of the second separator plate to cooperatively distribute the coolant fluid onto and vertically upward between the battery cells.

16. A method of constructing a battery assembly, the method comprising:

arranging a plurality of battery cells in a first cell row and a second cell row;

storing the battery cells in a battery housing, the battery housing including inlet and outlet fluid ports configured to respectively receive and evacuate therethrough a coolant fluid;

locating first and second separator plates between the first and second cell rows, the first and second separator plates each defining therein multiple coolant channels arranged in adjacent channel bands; and placing the first and second separator plates in face-to-face contact with each other such that each of the channel bands of the first separator plate is aligned with one or more of the channel bands of the second separator plate to cooperatively distribute the coolant fluid onto and vertically upward between the battery cells.

17. The method of claim 16, wherein the battery housing includes a base plate subjacent the battery cells and the first and second separator plates, and wherein the coolant channels of the first separator plate are oriented at a first oblique angle with respect to the base plate, and the coolant channels of the second separator plate are oriented at a second oblique angle, distinct from the first oblique angle, with respect to the base plate.

18. The method of claim 17, wherein the channel bands are arranged in mutually parallel rows oriented substantially parallel to the base plate of the battery housing.

19. The method of claim 18, further comprising forming the coolant channels as elongated grooves containing multiple through-holes extending through the first and second separator plates.

20. The method of claim 19, further comprising forming each of the first and second separator plates as a single-piece structure from an elongated and substantially flat metallic sheet.

* * * * *